Sept. 11, 1934.    O. WITTEL    1,973,457
PHOTOGRAPHIC FILM CARTRIDGE
Filed July 13, 1932    2 Sheets-Sheet 1
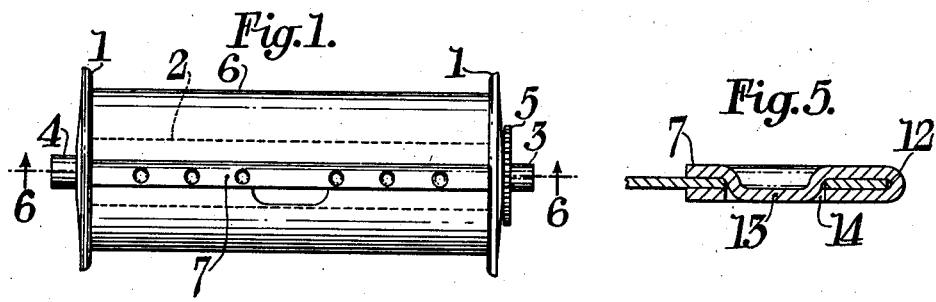
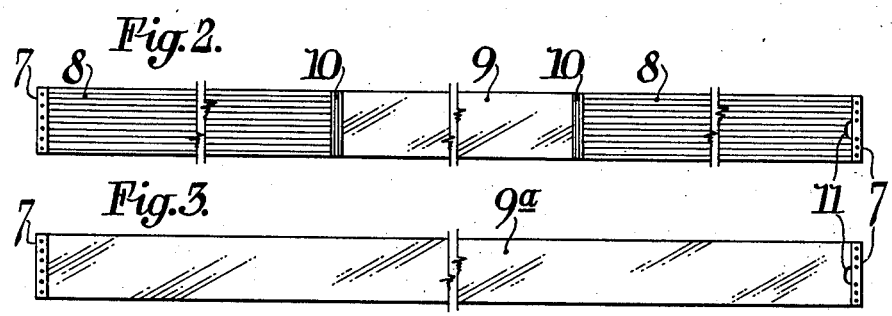
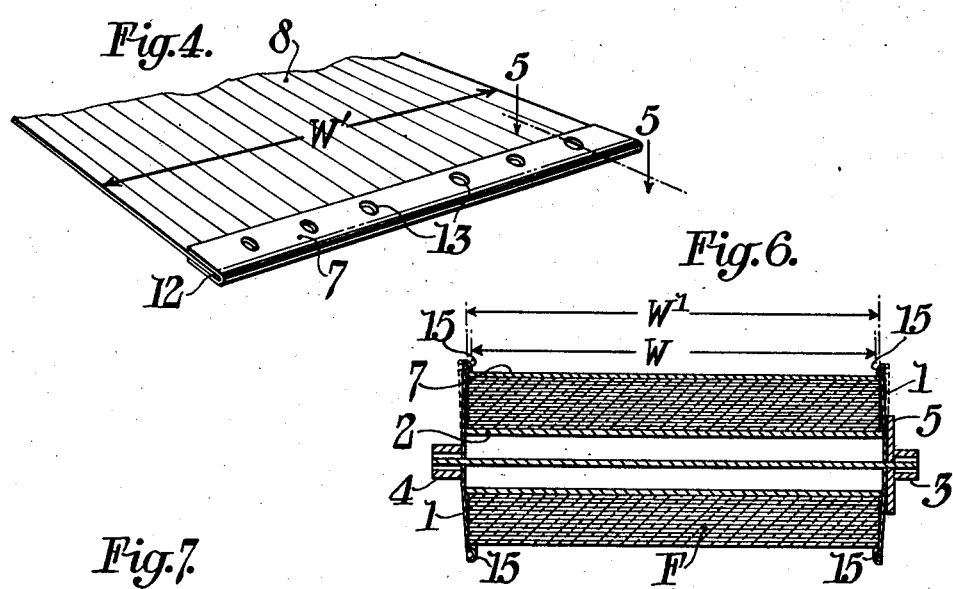
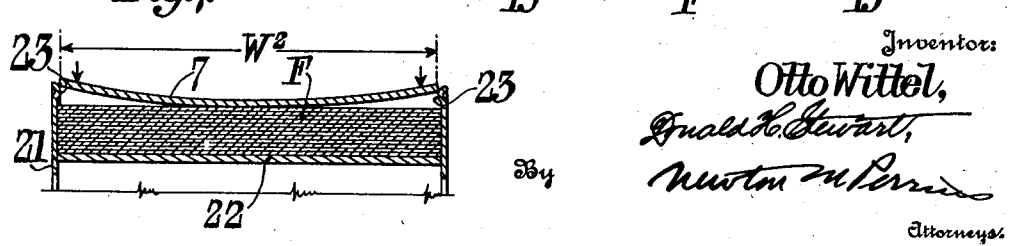
Inventor:
Otto Wittel,
Donald H. Stewart,
By Newton M. Perrin
Attorneys

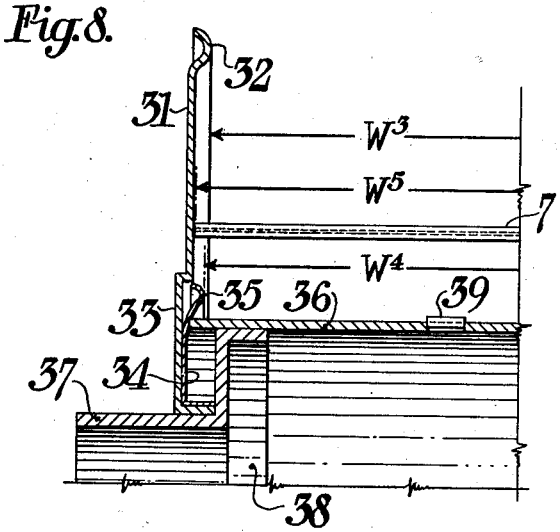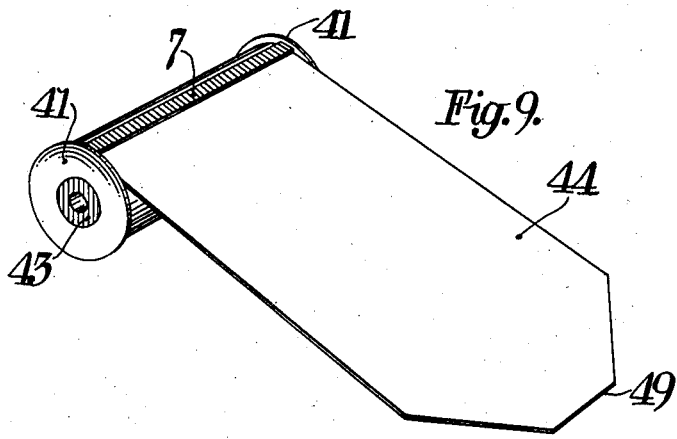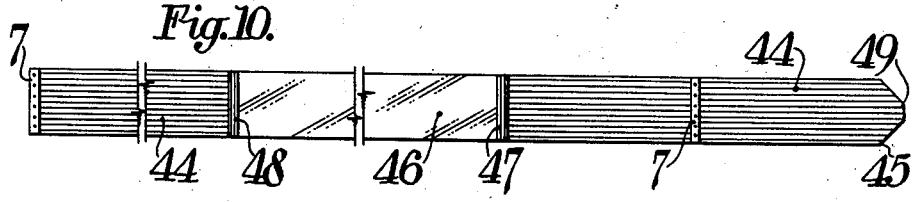

Patented Sept. 11, 1934

1,973,457

UNITED STATES PATENT OFFICE 1,973,457

PHOTOGRAPHIC FILM CARTRIDGE

Otto Wittel, Rochester, N. Y., assignor to Eastman Kodak Company, Rochester, N. Y., a corporation of New York Application July 13, 1932, Serial No. 622,297

27 Claims. (Cl. 95—9)

This invention relates to photography and more particularly to photographic film cartridges. One object of my invention is to provide a photographic film cartridge in which convolutions of film are wound on a spool and in which a snap latch is provided for retaining the convolutions of film in a wound position. Another object of my invention is to provide backing paper for a film cartridge in which the ends are reinforced. Another object of my invention is to provide a film strip with reinforced ends, these ends constituting one element of a snap latch for holding the convolutions of strip material on a spool. Another object of my invention is to provide a roll film cartridge including a strip of flexible material with a device for rendering the flexible material less flexible over certain areas thereof. Still another object of my invention is to provide a film spool in which the convolutions of strip material may be resiliently held against unwinding and other objects will appear from the following specification, the novel features being particularly pointed out in the claims at the end thereof.

Coming now to the drawings wherein like reference characters denote like parts throughout:

Fig. 1 is a side elevation of a film cartridge constructed in accordance with and embodying a preferred form of my invention.

Fig. 2 is a plan view of a composite flexible strip adapted to be wound on a film spool and constructed in accordance with my invention.

Fig. 3 is a view similar to Fig. 2 but showing a different embodiment of my invention.

Fig. 4 is a perspective view showing the stiffening material which reinforces one end of the flexible strip.

Fig. 5 is an enlarged fragmentary detail on line 5—5 of Fig. 4.

Fig. 6 is a sectional view through the film cartridge shown in Fig. 1, the section being taken on line 6—6 of Fig. 1.

Fig. 7 is a sectional view through half of a film cartridge illustrating another embodiment of my invention.

Fig. 8 is a fragmentary enlarged sectional view showing a spool construction constructed in accordance with still another embodiment of my invention.

Fig. 9 is a perspective view of a roll film cartridge with backing paper partially unrolled showing a stiffening member located in a different position from that in the other forms illustrated.

Fig. 10 is a plan view of the film strip which is used in the embodiment of my invention shown in Fig. 9.

It is customary in photographic film cartridges to wind convolutions of film and backing paper upon a spool. To attach the film to a spool, the end of the backing paper is generally thrust into a slot in the spool and the outer convolution is usually held in place by means of a sticker or paster.

Both of these operations make it somewhat more difficult to load a camera and the last operation—that of placing a paster around the film cartridge to hold the backing paper from unwinding—is a difficult one to perform without occasionally fogging the film, since very often, and particularly with the new, very small-sized cameras, it is difficult to place the paster on the film cartridge while it is in the camera.

My present invention is directed to overcoming both of these difficulties by providing a film cartridge in which the backing paper is actually latched by a form of snap latch to the film spool.

In the following specification and in the claims where I refer to film strip, I mean to use this term in the more generic sense, which includes not only a strip of light sensitive photographic coating on a suitable base, but also the backing paper, carbon paper, pasters for holding the film to the paper, and other elements which enter into making the complete strip which is wound upon a spool.

In accordance with a preferred embodiment of my invention, the snap latch may consist broadly of two elements one element being included in the spool and the other element being carried by the film strip, these two elements being so arranged that they may snap into a locking relation.

A preferred embodiment of my invention is shown in Fig. 1 wherein a spool is shown as consisting of a pair of spaced flanges 1 which are connected to a suitable hub member 2 and which are provided with trunnions 3 and 4 on which the spool may turn in a camera.

One trunnion 3 is provided with a gear 5 which cooperates with a special type of winding key.

On the core 2, convolutions of flexible material 6 are wound and on the end of the strip 6 there is a reinforcing strip 7 which renders the flexible material less flexible over that area which this strip covers.

The strip 7 may be made of almost any material which is stiffer than the backing paper or film and while I prefer to make this strip 7 of thin metal, it may be made of cardboard, cellulosic material or any other material which is sufficiently stiff for the purpose.

The film band, as indicated in Fig. 2, may comprise a strip of backing paper 8 to which a film strip 9 may be attached by the usual type of pasters 10. When the film is prepared for exposure, ordinarily one paster 10 is not attached to the backing paper. If desired, the backing paper need not extend behind the film 9, although this is customary.

The leader end of the strip material may be provided with a means for attaching the strip to a hub, such as a notch 11, cut through the backing strip 8 close to the reinforcing strip 7. I also prefer to provide a reinforcing strip 7 on the opposite end of the backing paper, that is, the end which will lie on the outside of an exposed film wound on a film cartridge.

It should be noted from Fig. 2 that the stiffening members 7 are at least as wide as the film strip. I find it convenient to have them exactly the same width, although the device will be completely operative if they are slightly wider than the film band.

Another embodiment of a film strip which may be used with my invention is shown in Fig. 3 where the film 9A is of the type having an opaque backing. When this type of film is used, the reinforcing members 7 may be attached directly to the film itself. Where the stiffening members 7 are attached to the film 9A, it is preferable to have these members made of metal since it is desirable to have the stiffening members made of a material which is considerably stiffer than the material to which they are attached.

As indicated in Figs. 4 and 5, the backing paper 8 may conveniently have the stiffening member 7 attached by means of folding the member 7 over the end 12 of the backing paper and pushing a series of protuberances 13 through the paper into apertures 14 previously punched in strip 7. Thus, two layers of thin metal form a resilient stiffening member which is capable of bending but which does not bend as freely as the paper 8 would otherwise.

As best shown in Fig. 6, the spool flanges 1 which are mounted upon the hub member 2 may be made of thin resilient metal which is slightly dish-shaped and which is provided with areas 15 towards the periphery of the flanges which are closer together than other areas of the flanges. The separation of the two areas 15, indicated by W in Fig. 6, is preferably slightly less than the width W1 of the backing paper and of the stiffening strip 7. Consequently, when convolutions of strip material designated broadly as F are wound upon the film core 2 and the strip 7 approaches the flanges, either the flanges will have to spring open to the position shown in broken lines in Fig. 6 or the strip 7 will have to bend to permit the strip to move between the areas 15.

While I prefer to make my spool with lightweight spring metal flanges, I prefer to have both the flanges and the strip 7 bend slightly when the two parts come in contact.

The strip 7 forms one element of a snap latch which is carried by the backing paper 8. The other element of the snap latch is formed by the areas 15 of the film spool flanges. Thus, when the strip material has been passed through a camera and the exposures have been made and the strip material is wound completely on the spool, the strip 7 will snap behind the flange areas 15 and thus form a snap latch holding the film against unwinding.

Of course, this presupposes that a well-known type of spring finger is mounted in a camera which will tend to press the strip 7 into proper relation with the spool flanges 1. However, it might be noted that since the spool flanges are of light-weight spring material and since the strip 7, while stiffening the end of the backing paper considerably, nevertheless, can bend with reasonable freedom, that it requires but little pressure to cause the snap latch to function properly.

In the embodiment of my invention shown in Fig. 7, the spool core 22 is equipped with rigid flanges 21 and these flanges are provided with rigid concentric rings 23 which form one element of a snap latch. In this form, the element of the snap latch carried by the film strip F—that is, the stiffening member 7—bends as indicated in Fig. 7 in snapping position behind the protuberances 23 on the flanges. In other words, the separation W2 of the inner faces 23 is slightly less than the width W1 of the backing paper and the width of the latch member 7.

As thus far described, the invention only contemplates providing a snap latch at the trailer end of the cartridge for sealing the exposed film.

However, it is entirely possible to provide two snap latches on a film spool, one of which will engage the leader end of the film and the other of which will engage the trailer end.

Accordingly, in Fig. 8 I have shown an enlarged fragmentary detail of a spool with which such a result can be obtained. In accordance with this figure, the spool flange 31 is provided with a latch element 32 in the form of an annular ring projecting inwardly from the periphery of the flange. The flange 31 is formed outwardly at 33 to receive an annular spring washer 34. This washer is provided with a spring latching member 35 which projects up a slight distance from the hub 36. The trunnion of the spool 37 may be carried by a thimble 38 attached to the hub. When a film band F is to be threaded onto a spool of this type, the stiffening member 7 on the leader end of the film is pressed downwardly with one finger between the flanges of the spool. This movement is readily accomplished, since the band 7 bends sufficiently to permit it to readily pass the latch members 32. By holding the strip 7 against the hub 36 and rotating the hub, the lug 39 may be brought into engagement with the aperture 11 of the leader end, and, at the same time, by pressing on the edges of the member 7, the ends are snapped into engagement with the second latch members 35 of the spool. This securely holds the leader end of the film in place. The operation can be very quickly performed and there is no need to turn a spool until a slot is in the proper position and laboriously pass the end of a film backing paper through the slot. The film spool is then turned to wind the film band through a camera. When the various exposures have been made, and finally when the film band F is completely wound on the spool, the stiffening end 7 on the trailer end of the film snaps behind the cooperating latch members 32 on the film spool flanges and thus automatically holds the film band against unwinding. The cover of the camera can then be removed and the film cartridge lifted from the camera without danger of fogging the film.

My invention is also useful in connection with the type of films now on the market in which the film must be manually threaded into a slot in a film spool.

Referring to Figs. 9 and 10, the film spool may include flanges 41 which are dish-shaped having projections in the form of annular rings near their peripheries. These flanges may be mounted on the usual type of wooden core 43 which is slotted. In loading a camera, it is desirable to pull out the end 44 of the backing paper a distance sufficient to thread the film into the take-up spool, but in doing this it sometimes happens that the film unwinds too far and that the leader end of the film is exposed.

My snap latch device can be used to overcome these difficulties. As shown in Fig. 10, the backing paper leader strip 44 may be tapered at 45 to facilitate threading into a film spool. A film 46 may be attached to the backing paper by means of the usual paster 47 and a paster 48 may be attached to the rear end of the film.

I prefer to place a stiffening member 7 some distance from the end 49 of the backing paper—a distance sufficient to allow a length of film backing paper to be unwound for threading.

As indicated in Fig. 9, when the backing paper 44 is drawn out, the stiffening member 7 still remains latched behind the cooperating latch members 42 of the spool. With the backing paper drawn out to this extent, it may be threaded into the take-up spool and the camera back may be placed on after which, by turning the winding key, the cooperating latch members 7 and 42 may be disengaged by applying very slight additional pressure to the winding key. In this manner, the accidental fogging of film in loading can be prevented.

I prefer to also place a stiffening member 7 on the trailer end of the film, as shown in Fig. 10, so that when the film cartridge has been completely wound upon the take-up spool, the latch member 7 will snap into engagement with its cooperating members 42 thus automatically sealing the exposed film.

I am aware that several forms of self-sealing cartridges have been proposed employing slow drying adhesives or other materials which are not particularly suitable for winding through a camera past an objective, particularly in cases where there is but little clearance in the camera. This is true of practically all of the new, ultra-thin cameras. These inventions, however, do not make use of a definite snap latch, one element of which is included in the spool and the other element of which is included in the film band.

Such a snap latch may, in accordance with my invention, be used on any desired portion of the strip material to latch one end, both ends, or one or more positions located between the ends.

Since I prefer to make the elements of my snap latch of metal, the successful operation of this device does not depend at all on conditions which cannot be controlled, such as heat, humidity, and climatic conditions which must be considered if any form of adhesive material is employed or if the resiliency of any material, such as paper, which is susceptible to such conditions must enter into the operation of the device.

It is obvious that while I have described preferred embodiments of my invention, that there are a large number of other embodiments which would come within the scope of my invention. I therefore contemplate as within the scope of my invention all such forms as may be covered by the appended claims.

What I claim is:

1. In a photographic film cartridge, the combination with a spool having flanges with annular rims closer together than the remainder of the flanges, of strip material adapted to be wound upon the spool between the flanges, cooperating elements carried by the spool and strip material at least one of which is made of resilient material, said cooperating elements comprising said annular rims of the film spool flanges and a reinforcing strip carried by said backing paper, said strip being of a width greater than the distance between the annular rims of the film spool flanges.

2. In a photographic film cartridge, the combination with a spool having flanges, of strip material adapted to be wound upon the spool, means for holding the strip material upon the spool comprising a snap latch, an annular rib on the spool flanges forming one element of said snap latch, and a member carried by the strip material forming the other element of the snap latch, said member being adapted to engage any portion of said annular rib.

3. In a photographic film cartridge, the combination with a spool having flanges, of strip material adapted to be wound upon the spool, means for holding the strip material upon the spool comprising a snap latch, annular formings in said film spool flanges projecting toward each other and forming one element of said snap latch, and a resilient reinforcing member attached to the backing paper forming the other element of said snap latch, and being adapted to engage any portion of the annular formings on the film spool flanges.

4. In a photographic film cartridge, the combination with a spool having flanges, of strip material adapted to be wound upon the spool, means for holding the strip material upon the spool comprising a snap latch, annular formings in said film spool flanges projecting toward each other and arranged concentric with said flanges and forming one element of said snap latch, and a reinforcing member attached to the backing paper forming the other element thereof, at least one element of the snap latch being made of inherently resilient material, said reinforcing member having a length greater than the distance between the formings in the film spool flanges, whereby said member may snap into or out of a cooperative relation with said annular formings throughout any part of the periphery thereof.

5. In a photographic film cartridge, the combination with a spool having flanges, of strip material adapted to be wound upon the spool, means for holding the strip material upon the spool comprising a snap latch, annular formings in said film spool flanges forming one element of said snap latch, and a latching bar attached to the backing paper forming the other element thereof, said latching bar having a length greater than the distance between the formings in the spool flanges, at least one element of the snap latch being resilient whereby the elements may cooperate to hold the strip material on said spool irrespective of the portion of the spool flanges engaged by said latching bar.

6. In a photographic film cartridge, the combination with a spool having flanges, of strip material adapted to be wound upon the spool, means for holding the strip material upon the spool comprising a snap latch, annular formings in said film spool flanges forming one element of said snap latch, and a latching bar attached to the backing paper forming the other element thereof, said latching bar having a length greater than the distance between the annular formings in the spool flanges, said film spool flanges being formed of resilient material whereby said latching bar may snap into the formings therein from any angular position.

7. In a photographic film cartridge, the combination with a spool having flanges, of strip material adapted to be wound upon the spool, means for holding the strip material upon the spool comprising a snap latch, annular formings in said film spool flanges forming one element of said snap latch, and a latching bar attached to the backing paper forming the other element thereof, said latching bar having a length greater than the distance between the annular formings in the spool flanges, said latching bar being attached to the end of the strip material and being made of resilient material whereby said bar may snap automatically into the formings in the spool flanges as the strip material is wound on said hub.

8. In a photographic film cartridge, the combination with a spool having flanges, of strip material adapted to be wound upon the spool, means for holding the strip material upon the spool comprising a snap latch, annular formings in said film spool flanges forming one element of said snap latch, and a latching bar attached to the backing paper forming the other element thereof, said latching bar having a length greater than the distance between the formings in the spool flanges and being made of resilient material, said spool flanges also being made of resilient material whereby but little force is required to automatically engage or disengage said members by moving said strip material to and from said spool.

9. A film band for photographic film cartridges adapted to be wound on a spool comprising a strip of flexible material having an end, a reinforcing strip attached to the end and extending across the entire width of the strip, a reinforcing strip, said reinforcing strip comprising a spring metal strip.

10. A film band for photographic film cartridges adapted to be wound on a spool comprising a strip of flexible material having an end, a reinforcing strip attached to the end and extending across the entire width of the strip, a reinforcing strip, said reinforcing strip comprising a spring metal strip.

11. A leader strip for a photographic film cartridge comprising a band of a predetermined width and of flexible material, and having a notch in the end of the material and a flexible metallic strip fastened across the width of the material and across the notch therein.

12. A leader strip for a photographic film cartridge comprising a band of flexible material having an end reinforced by a transverse flexible metallic strip, said strip being permanently attached to and at least as long as the width of the strip.

13. In a roll film, the combination with a spool having flanges with annular peripheries formed closer together than the remainder of the flanges, a strip of flexible coiled material wound thereon, of means for holding said flexible coiled material against unwinding comprising a relatively stiff but still flexible strip of material fastened to the flexible coiled material transversely thereof and of a width greater than the distance between the annular flange periphery and adapted to frictionally engage and be held by any portion of the annular peripheries of the film spool flanges.

14. A roll film cartridge comprising a spool having flanges, the peripheries of which are spaced a predetermined distance and a flexible coil of material adapted to be wound on said spool, means for retaining the strip against unwinding comprising a transverse, flexible, metal band wider than the spool flanges and adapted to frictionally engage said flanges.

15. In a photographic film cartridge, the combination with a spool having flanges closer together at the peripheries than at other portions thereof, of a band of flexible material of at least as great a width as the distance between the peripheries of the flanges of the spool and adapted to be wound thereon, and flexible reinforcing means carried by the band of flexible material and extending transversely thereof and adapted to frictionally engage the peripheries of the flanges adapted to impede movement of the strip past said flanges.

16. In a photographic film cartridge, the combination with a spool including a hub and flanges capable of moving relative to the hub, said flanges including annular portions closer together than other portions thereof, of a strip having a width at least as great as the shortest distance between flanges, a reinforcing band attached to the strip and at least as wide as the strip and made of slightly flexible material whereby the combined flexibility of the spool flanges and reinforcing strip tend to form a snap latch resiliently latching the strip material to the spool.

17. A band of flexible strip material adapted to be wound on a spool comprising a film, a protective covering for the film having an end thereof cut off at right angles to the film and a flexible metallic strip at least as wide as the strip material attached to said strip to reinforce certain areas of said strip, said areas extending transversely of the strip throughout the entire width thereof.

18. In a photographic film cartridge, the combination with a film band having a resilient reinforcing bar forming an element of a snap latch at both ends thereof, of a spool including a hub, flanges carried by the hub, at least one flange including two annular concentrically arranged snap latch elements adapted to cooperate with the snap latch element of the film band.

19. In a photographic film cartridge, the combination with a film band having a resilient reinforcing bar forming an element of a snap latch at both end thereof, of a spool including a hub, flanges carried by the hub, at least one flange including two annular concentrically arranged resilient snap latch elements adapted to cooperate with the snap latch element of the film band, said snap latch elements comprising annular formings concentric with the flange and being located on said flange, one adjacent the periphery of the flange and the other adjacent the hub thereof, whereby winding strip material on said hub may automatically engage said snap latch elements.

20. In a photographic film cartridge, the combination with a film band having a resilient reinforcing bar forming an element of a snap latch at both ends thereof, of a spool including a hub, flanges carried by the hub, at least one flange including two annular concentrically arranged snap latch elements adapted to cooperate with the snap latch element of the film band, said snap latch elements comprising annular projections concentric with the flange and being located on said flange, one adjacent the periphery of the flange and the other adjacent the hub thereof, said snap latch elements being made of resilient material and being adapted to become automatically engaged with the snap latch spool elements solely by winding said band on said hub.

21. In a photographic film cartridge, the combination with a film band including snap latch elements carried by each end thereof, said elements comprising reinforcing strips of resilient material attached transversely to the film band, of a spool on which such film band may be wound including flanges, and two snap latch elements carried by the flanges and comprising annular members concentric of the flanges and spaced closer together than the remainder of the flanges and adapted to cooperate with snap latch elements of the film band when the latter is wound on the spool.

22. In a photographic film cartridge, the combination with a film band including snap latch elements carried by each end thereof, of a spool on which such band may be wound including flanges, and two annular snap latch elements carried by the flanges adapted to cooperate with the snap latch elements of the film band when the latter is wound into the spool, at least one of the snap latch elements being made of resilient material.

23. In a photographic film cartridge, the combination with a film band including snap latch elements carried by each end thereof, said snap latch elements comprising reinforcing strips of inherently resilient material attached to the film band crosswise of the film band, of a spool on which such band may be wound including flanges, each flange including two annular snap latch elements concentric with the flanges and located respectively near the hub and near the periphery thereof and adapted to be engaged by the snap latch elements of the film band by winding the film band into the spool.

24. In a photographic film cartridge, the combination with a film band including snap latch elements carried by each end thereof, said snap latch elements comprising reinforcing strips of an inherently resilient material attached to the film band and extending crosswise thereof, of a spool on which such band may be wound including flanges, each flange including two snap latch elements comprising a pair of annular formings concentrically arranged with respect to the flanges and located respectively near the hub and near the periphery thereof and adapted to be engaged by the snap latch elements of the film band by winding said film band upon said spool.

25. In a photographic film cartridge, the combination with a film band including snap latch elements carried by each end thereof, of a spool on which such band may be wound including flanges, each flange including two snap latch elements comprising a pair of resilient concentric rings located respectively near the hub and near the periphery thereof and adapted to be engaged by the snap latch elements of the film band.

26. In a photographic film cartridge, the combination with a film band including snap latch elements carried by each end thereof, of a spool on which such band may be wound including flanges, each flange including two snap latch elements comprising a pair of independently resilient concentric rings located respectively near the hub and near the periphery thereof and adapted to be engaged by the snap latch elements of the film band.

27. In a photographic film cartridge, the combination with a spool having flanges with continuous rims spaced closer together than other parts of said flanges of strip material adapted to be wound on said spool, a flexible reinforcing strip fastened crosswise of said material adapted to stiffen a limited area thereof, said reinforcing strip being of a width adapted to positively engage the closest flange areas, whereby said flexible strip material may be wound upon said spool and said stiffened area may frictionally engage any portions of the continuous closely spaced rims of the spool flanges and be automatically held thereby against unwinding.

OTTO WITTEL.